US010047899B2

United States Patent
Guest et al.

(10) Patent No.: US 10,047,899 B2
(45) Date of Patent: Aug. 14, 2018

(54) EXTENDIBLE LEGS FOR TRIPODS

(71) Applicant: Vitec Group PLC, Suffolk (GB)

(72) Inventors: James Edward Guest, Suffolk (GB); Richard Arthur Lindsay, Suffolk (GB)

(73) Assignee: Vitec Group PLC, Suffolk (GB)

( * ) Notice: Subject to any disclaimer, the term of this patent is extended or adjusted under 35 U.S.C. 154(b) by 406 days.

(21) Appl. No.: 14/759,107

(22) PCT Filed: Dec. 18, 2013

(86) PCT No.: PCT/GB2013/053351
§ 371 (c)(1),
(2) Date: Jul. 2, 2015

(87) PCT Pub. No.: WO2014/106733
PCT Pub. Date: Jul. 10, 2014

(65) Prior Publication Data
US 2016/0298805 A1    Oct. 13, 2016

(30) Foreign Application Priority Data

Jan. 4, 2013  (GB) .................................. 1300126.8

(51) Int. Cl.
*F16M 11/32* (2006.01)
*F16B 7/14* (2006.01)
(Continued)

(52) U.S. Cl.
CPC ........... *F16M 11/32* (2013.01); *F16B 7/1454* (2013.01); *F16B 7/105* (2013.01); *F16M 11/245* (2013.01);
(Continued)

(58) Field of Classification Search
CPC .. F16M 2200/027; F16M 11/34; F16M 11/16; F16M 2200/028; F16M 11/32;
(Continued)

(56) References Cited

U.S. PATENT DOCUMENTS 821,335 A * 5/1906 Butler .................... F16M 11/16
                                              248/168
1,244,682 A * 10/1917 Akeley ................ A47B 13/021
                                              248/188
(Continued)

FOREIGN PATENT DOCUMENTS

CN      201193765      2/2009
GB      1325292        8/1973
GB      2262306        6/1993

*Primary Examiner* — Stanton L Krycinski
*Assistant Examiner* — Taylor L Morris
(74) *Attorney, Agent, or Firm* — Pepper Hamilton LLP (57) ABSTRACT

An extendable leg (11) for a tripod (10) (for supporting an optical apparatus such as a video camera), the leg being V-shaped and having telescopic side members (15,16) to enable the length of the leg to be varied with hinge means to connect the side members to each other at an apex of the V, means to connect the side members to a head (12) of the tripod which allow the angle of the V to vary with extension and retraction of the leg, and clamping means (50) to clamp the side members at a required length; wherein the leg has a mechanism for controlling the extension and retraction of the side members when the locking means is released whereby the apex of the leg is constrained to move generally linearly in the lengthwise direction of the leg.

20 Claims, 11 Drawing Sheets

(51) Int. Cl.
*F16M 11/24* (2006.01)
*F16B 7/10* (2006.01)
*F16M 11/34* (2006.01)

(52) U.S. Cl.
CPC ....... *F16M 11/34* (2013.01); *F16M 2200/027* (2013.01)

(58) Field of Classification Search
CPC .... F16M 11/26; F16M 2200/02; F16M 11/36; F16M 11/245; G03B 17/561; F16B 7/1454; F16B 7/105
USPC ......... 248/168, 188.5, 188, 435, 161, 163.1, 248/169, 170, 177.1
See application file for complete search history.

(56) References Cited

U.S. PATENT DOCUMENTS

| | | | | |
|---|---|---|---|---|
| 1,358,402 A * | 11/1920 | Thalhammer | .......... | F16M 11/08 248/168 |
| 1,394,691 A | 10/1921 | Spence, Jr. | | |
| 1,426,088 A | 8/1922 | Mitchell | | |
| 1,573,496 A * | 2/1926 | Jansson | ................ | F16M 11/046 248/171 |
| 1,574,894 A * | 3/1926 | Jansson | ................ | F16M 11/046 248/171 |
| 1,863,761 A * | 6/1932 | Neuwirth | ............. | F16B 7/1472 248/168 |
| 1,907,210 A * | 5/1933 | Matson | ................ | F16M 11/245 248/188.91 |
| 2,206,069 A * | 7/1940 | Adams | ................... | F16M 11/32 248/188.5 |
| 2,211,314 A * | 8/1940 | Beggs | ................... | F16M 11/18 248/188.5 |
| 2,262,938 A * | 11/1941 | Howard | ................ | F16M 11/16 248/188.5 |
| 2,318,910 A * | 5/1943 | Zucker | ................... | F16M 11/10 248/183.2 |
| 2,463,655 A * | 3/1949 | Temple, Jr. | ............ | F16M 11/16 248/168 |
| 2,487,451 A * | 11/1949 | Kurmer | ................... | G01B 3/02 33/558.02 |
| 2,519,549 A * | 8/1950 | Coutant | ................ | F16M 11/16 248/188.5 |
| 2,534,659 A * | 12/1950 | Cardona | ................ | F16M 11/16 248/188.5 |
| 3,051,425 A * | 8/1962 | Homrighausen | ...... | G01C 15/10 248/168 |
| 3,879,027 A * | 4/1975 | Thurmond, Jr. | ..... | B25H 1/0014 211/22 |
| 4,163,322 A * | 8/1979 | Partes | ....................... | B43L 9/20 33/27.02 |
| 4,196,881 A | 4/1980 | Davidson | | |
| 4,570,886 A * | 2/1986 | Mooney | ................. | F16M 11/34 248/186.1 |
| 4,767,090 A * | 8/1988 | Hartman | ............... | F16M 11/16 24/273 |
| 5,253,833 A * | 10/1993 | Indou | ..................... | F16M 11/36 248/168 |
| 5,503,357 A * | 4/1996 | Johnson | ................ | F16M 11/16 248/169 |
| 5,634,874 A * | 6/1997 | Kest | ....................... | A63B 21/015 482/114 |
| 6,272,785 B1 * | 8/2001 | Mika | ....................... | F41A 23/14 42/94 |
| 6,286,795 B1 * | 9/2001 | Johnson | ................ | F16M 11/16 248/163.1 |
| 6,688,566 B1 * | 2/2004 | Crain | ..................... | G01C 15/00 248/168 |
| 6,942,187 B2 * | 9/2005 | Blackburn | ............. | F16M 11/32 248/163.1 |
| 7,604,208 B2 * | 10/2009 | Tacklind | ................ | F16M 11/36 248/170 |
| 7,654,494 B2 * | 2/2010 | Cartoni | .................. | F16M 11/36 248/163.1 |
| 8,231,088 B2 * | 7/2012 | Lu | ........................ | F16M 11/34 248/163.1 |
| 8,292,240 B2 * | 10/2012 | Hein | ...................... | F16M 11/32 248/125.8 |
| 9,351,573 B2 * | 5/2016 | Lee | ........................ | A47B 97/04 |
| 2013/0026309 A1 * | 1/2013 | Ball | ........................ | G06F 1/166 248/122.1 |

* cited by examiner

EXTENDIBLE LEGS FOR TRIPODS

CROSS REFERENCE TO RELATED APPLICATIONS

This application is a National Phase of PCT Patent Application No. PCT/GB2013/053351 filed Dec. 18, 2013, which claims priority to Great Britain Application No. 1300126.8 filed Jan. 4, 2013 which is incorporated herein by reference in its entirety.

This invention relates to an extendible leg for a tripod and is particularly, although not exclusively, applicable to extendible legs for tripods for optical apparatus suitable for supporting TV/video cameras.

A typical tripod for carrying optical apparatus has a triangular head usually formed with a bowl to receive the apparatus and three legs hinged to the respective sides of the head. Each leg extends and retracts telescopically to enable the legs to be reduced to a minimum length when the tripod is not in use and to be extended to a suitable length when the tripod is in use. Typically each leg comprises a plurality of stages telescopically connected together with a clamping mechanism between each pair of adjacent stages to enable the stages to be extended and retracted to adjust the length of the leg. When a camera or other optical apparatus supported on the tripod is moved in pan (i.e. swung, about a generally vertical axis on the tripod), a torque is imposed on the tripod which is resisted by the tripod legs. One known form of leg described and illustrated in our UK Patent Publication No. 2262306 has stages consisting of pairs of parallel tubes which are telescopically connected with bridging elements securing the respective ends of the tubes together to provide rectangular structures. The rigidity of such structures in the plane of the rectangle depends on the strength of the corners of the structures and since the corners can flex such structures are not inherently stiff. On the other hand a leg of triangular form is inherently stiff in the plane of the triangle but if the triangle has telescopic sides to enable the leg to be extended and retracted, it can be difficult to preserve the proportions of the telescopic skies (normally of equal length) and therefore the form of the triangle the same when the leg is being extended or retracted with the clamping of the telescopic sides released.

It is an object of the present invention to provide a V-shaped leg for a tripod which forms a triangle with the head of the tripod and which provides the inherent stiffness of a triangular form when the skies of the leg are clamped and substantially maintains the proportions of the sides of the leg and therefore the triangular form of the leg as in its fully extended and fully retracted states when the sides of the leg are undamped for adjustment of the length of the leg.

This invention provides an extendable leg for a tripod (for supporting an optical apparatus such as a video camera), the leg being V-shaped and having telescopic side members to enable the length of the leg to be varied with hinge means to connect the side members to each other at an apex of the V, means to connect the side members to a head of the tripod which allow the angle of the V to vary with extension and retraction of the leg, and clamping means to clamp the side members of a required length; wherein the leg has a mechanism for controlling the extension and retraction of the side members when the locking means is released whereby the apex of the leg is constrained to move generally linearly in the lengthwise direction of the leg.

In a preferred arrangement said control mechanism for controlling the extension and retraction of the side members of the leg may constrain the apex to move linearly in line with a median line which extends from the apex of the leg lengthwise of the leg.

More specifically, the control mechanism may comprise means to control movement of the side members towards and away from said median line.

For example, the control mechanism may comprise means acting on the side members to cause the side members to move by equal amounts and in opposite directions with respect to said median line whereby the apex of the leg is caused to move linearly in line with said median one.

In the latter arrangement the means acting on the side members of the leg to cause the members to move by equal amounts and in opposite directions with respect to said median line may act on the side members at a location partway along the leg.

For example, the leg may comprise a plurality of stages, one of which is an upper stage and one of which is a lower stage, and each stage comprises a pair of elongate members telescopically engaged with the members of the or each adjacent stage, with releasable clamping means between adjacent stages to enable the length of the leg to be adjusted as required, and the control mechanism may act on the elongate members of at least one stage so that the part of the leg from that stage to the apex is controlled so as to constrain the apex to move linearly in line with said median line as the length of the leg is adjusted.

In that case, the leg may have at least one intermediate stage and said control mechanism may constrain the elongate members of that stage to move with each other in the lengthwise direction of the leg and to move by equal amounts and in opposite directions towards and away from said median line as the length of the leg is adjusted.

The control mechanism may comprise means to link the members of said intermediate stage to move with each other in the lengthwise direction of the leg and to move by equal amounts and in opposite directions towards and away from said median line. In that arrangement the control mechanism may maintain at least that part of the leg from said intermediate stage to the apex of the leg in the form of an isosceles triangle so that the apex of the leg moves in line with a median of the triangle as the length of the leg is adjusted.

Preferably the leg, when fully extended and fully retracted, is also of isosceles triangular form.

In a preferred arrangement according to the invention the control mechanism may comprise arms projecting from the elongate members of said intermediate stage and a bridge linking the arms to move with each other in the longitudinal direction of the leg, and means on the bridge interconnecting the arms to cause the arms to move by equal amounts and in opposite directions with respect to said median line as the leg is extended and retracted, whereby the apex of the leg is caused to move in line with said median line as the length of the leg is adjusted.

In such an arrangement the arms may project from corresponding positions on said elongate members of the intermediate stage and have an articulated engagement with the bridge to allow the arms to swivel with respect to the bridge as the convergence angle of the leg members changes with extension and retraction of the leg whilst the elongate members of the leg move by equal amounts and in opposite directions with respect to the median line.

Said interconnecting means may be mounted on the bridge and act between the arms to cause the arms to move by equal amounts and in opposite directions with respect to said median line.

In one specific arrangement the arms may have toothed racks and the interconnecting means may comprise a pinion rot at ably mounted on the bridge and in engagement with the toothed racks on opposite sides of the pinion to cause the leg members to which the racks are mounted to move by equal amounts and in opposite directions with respect to the said median line.

In any of the latter arrangements a locking arrangement may be provided on the bridge for locking the arms against movement with respect to the bridge and an actuator member is mounted on the bridge for engaging and releasing the locking mechanism.

Also, the leg may have a single intermediate stage between said upper and lower stages and said clamping means are provided on said intermediate stage for clamping that stage to both the upper and lower stages of the leg.

In a further arrangement the leg may have multiple intermediate stages between said upper and lower stages and said clamping means are provided on a number of the stages for clamping the stages against extension and retraction.

In the latter arrangement the leg may have an odd number of intermediate stages and clamping means may be provided on alternate intermediate stages to clamp that stage or those stages to the stage nearer the base and to the stage nearer the apex of the leg.

In an alternative arrangement the clamping means may be provided on alternate intermediate stages to clamp the respective stages to the stage nearer the base and the stage nearer the apex and clamping means may also be provided on the stage next to the lower stage to clamp that stage to the lower stage.

In any of the letter arrangements the clamping means for an intermediate stage may comprise a pivotally mounted beam located eccentrically between said members of the intermediate stage, a rotary coupling at each end of the beam for applying equal force to the clamping means on the respective stage members, and an actuator for displacing the beam about the eccentric axis to cause the clamping means to engage and release.

More specifically, the couplings at the ends of the member may act directly on clamps for clamping the members of the intermediate stage to the members of one of the stages adjacent thereto and to act through operating members extending through the members of the stage to operate clamps for clamping the members of the intermediate stage to the members of the other adjacent stage, the rotary members being arranged to apply substantially equal force to the clamps at the respective ends of the members of the intermediate stage of the leg.

Preferably the rotary couplings act directly on the clamping means for the stage nearer the base and through said operating members to the clamping members for the stage nearer the apex.

The rotary coupling may have eccentric elements, one of which acts directly on the clamping for one of the stages and the other of which acts through an operating member extending through the intermediate member of the leg for applying equal force to the clamping means for clamping the intermediate member to the adjacent stages.

The case where said members of the intermediate stage are linked by arms and a bridge between the arms, the beam may be eccentrically mounted on the bridge.

More specifically the beam may be mounted eccentrically in an arcuate gear rotatably mounted on the bridge and said actuator is mounted for rotation about a parallel axis on the bridge and has a segmental gear which meshes with the arcuate gear to cause the beam to rotate with rotation of the actuator to apply and release the clamps.

In any of the latter arrangements the elongate members of the leg may comprise nested channel section members and the operating mechanism for the clamping means may extend through the channel section members of the intermediate section to act on the clamping means at each end of the members.

By way of example said actuator member may be mounted on the bridge for engaging and releasing the locking mechanism for the arms and may also be arranged to lock and release the clamping means for controlling the extension and retraction of the stages of the leg.

In any of the above arrangements the members of the upper stage may have connections adapted to be pivotally connected to the base for the leg to hinge about an axis extending between said ends and to avow the members to pivot towards and away from each other.

For example the members of the upper stage may have resilient connections between the members and pivots.

The resilient connections of the members of the upper stage may provide a resistance to flexing away from a neutral position reached when the leg is in mid-extension. The advantage of this configuration is that it minimises the stress in the flexure when it is bent to the maximum or minimum angle as the leg is either fully retracted or extended.

In a further arrangement the control means may act between the members of the stage adapted to be connected to the tripod head to cause those stages to mirror the angles with respect to the tripod head at which the members converge towards one another throughout extension and retraction of the stages of the leg whereby the extension and retraction of the members which make up each side of the leg is maintained equal.

For example, the arms may have overlapping toothed racks and the interconnection means may comprise a pinion rotatably mounted on the bridge and in engagement with the toothed racks to cause the leg members to which the racks are mounted to mirror their movements with respect to said line which bisects the leg.

Preferably, a said side member of said V-shaped leg is inclined from said apex in a direction, which in use, opposes a rotational force applied to a tripod. The advantage of this configuration is that the inclined side member resists the rotational force being applied by applying a resulting downward pressure along the incline to apex member of the leg. The downward pressure pushes the apex into the ground beneath it, therefore providing a resistance to the rotational force being applied, which prevents the tripod from rotating and minimises any deformation of the tripod.

The following is a description of some specific embodiments of the invention, reference being made to the accompanying drawings, in which.

Figure 1:
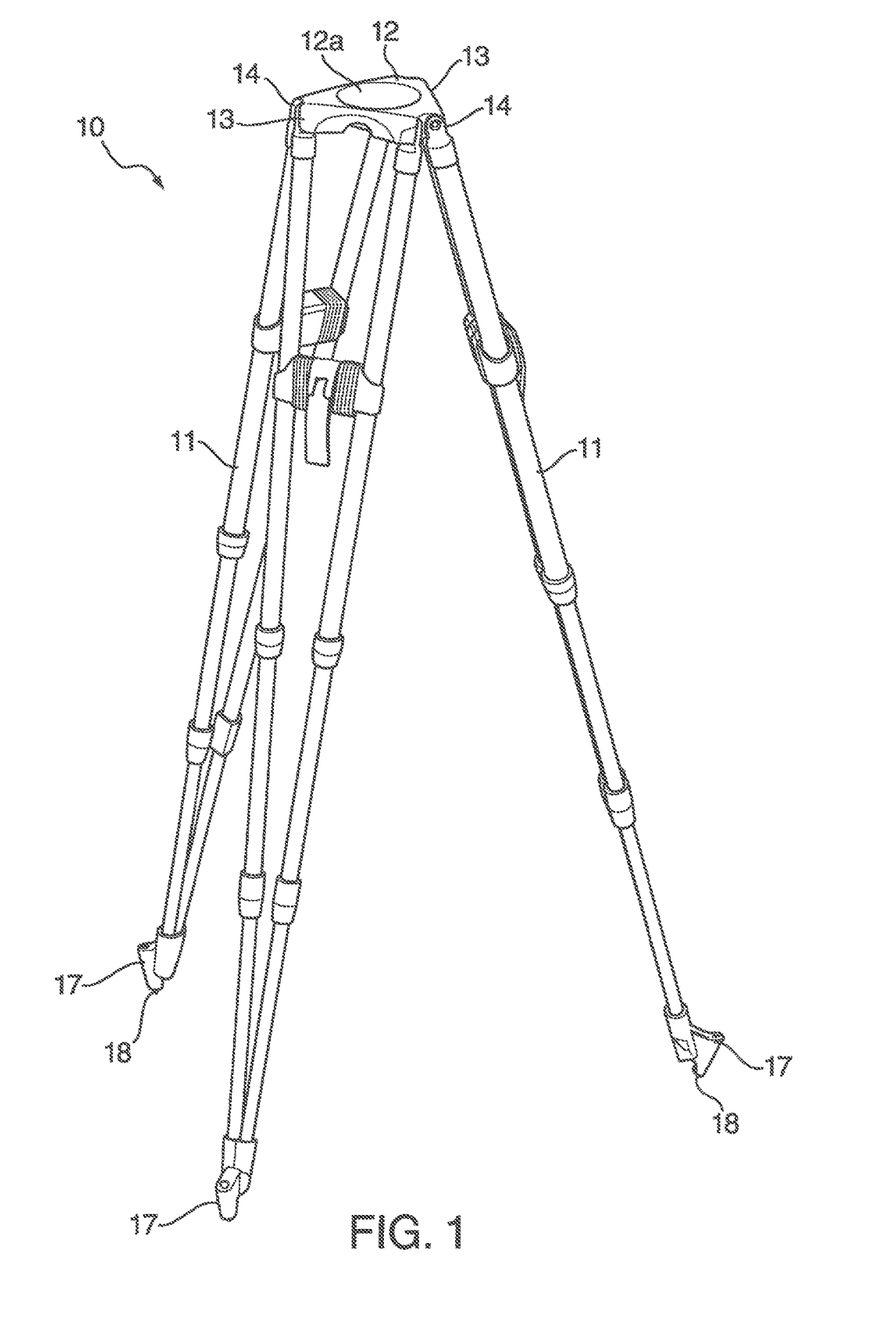
FIG. 1 is a perspective view of a tripod for a T.V., video or cine camera having a head supported on V-shaped legs each of which has extendible stages to vary the height of the tripod.
Figure 2:
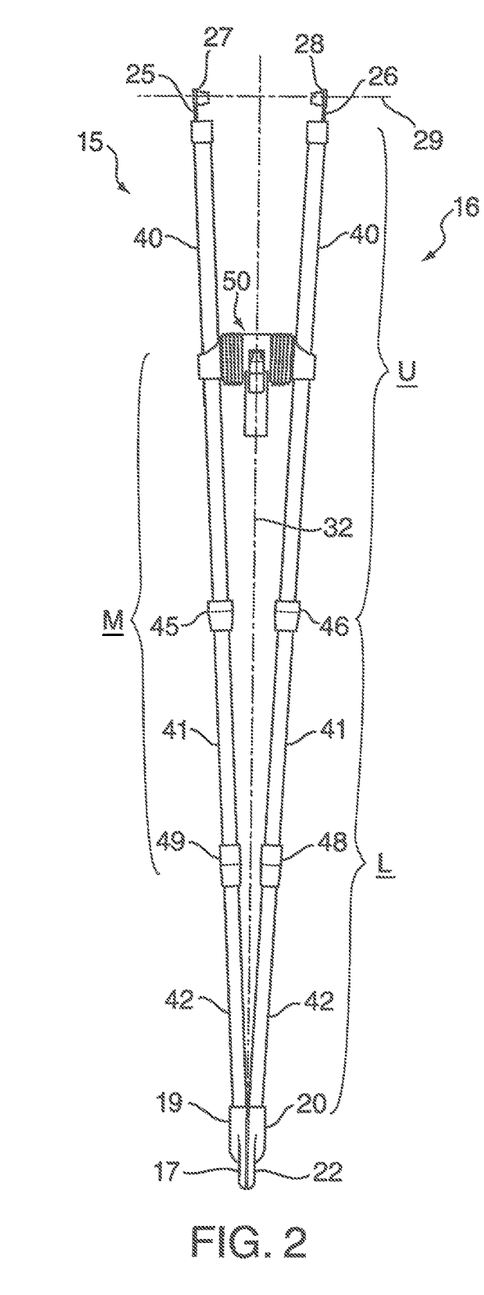
FIG. 2 is an elevation view of one of the extendible V-shaped legs of the tripod showing the telescopic sides which make up the multiple stages of the leg.

Referring firstly to FIG. 1 of the drawings, there is shown a tripod stand indicated generally at 10 having telescopically extendable legs 11 and a triangular head 12 The head has a central bowl 12a to receive a standard part spherical mounting on the underside of a pan and tilt head (not shown) suitable for a TV/video camera. Each side 13 of the head has spaced oppositely facing sockets 14 to receive pivot pins (see below) on the upper ends of the legs to support the legs for pivotal movement about axes extending along the respective sides of the head.

Figure 3:
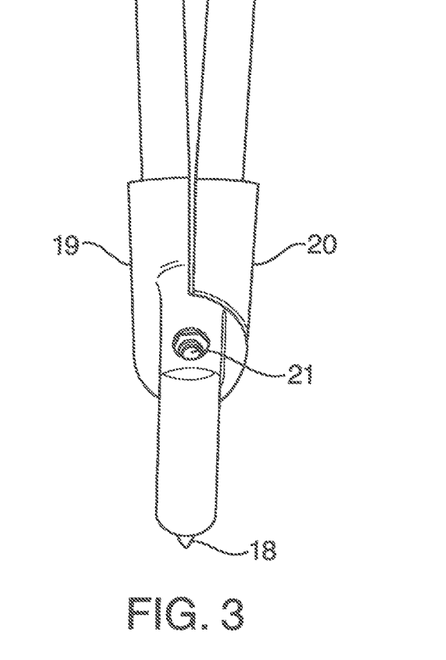
FIG. 3 is a detailed view of the lower, apex end of the leg.

FIGS. 2 to 5 to which reference should now be made show the leg 11 in greater detail. The leg 11 comprises a pair of telescopically extendable side members 15 and 16 respectively, which converge towards their lower ends in V formation and are secured in a foot 17. The foot has an offset angled spike 18 for engaging the ground. The foot has two separate sockets 19, 20, in which the lower ends of the side members 15, 16 are secured as can be seen in FIG. 3. The sockets 19, 20 are pivotally connected together at 21 to pivot about an axis extending normal to the plane of the leg to allow the angle between the members of the leg to vary as the leg is extended and retracted as described later.

Figure 4:
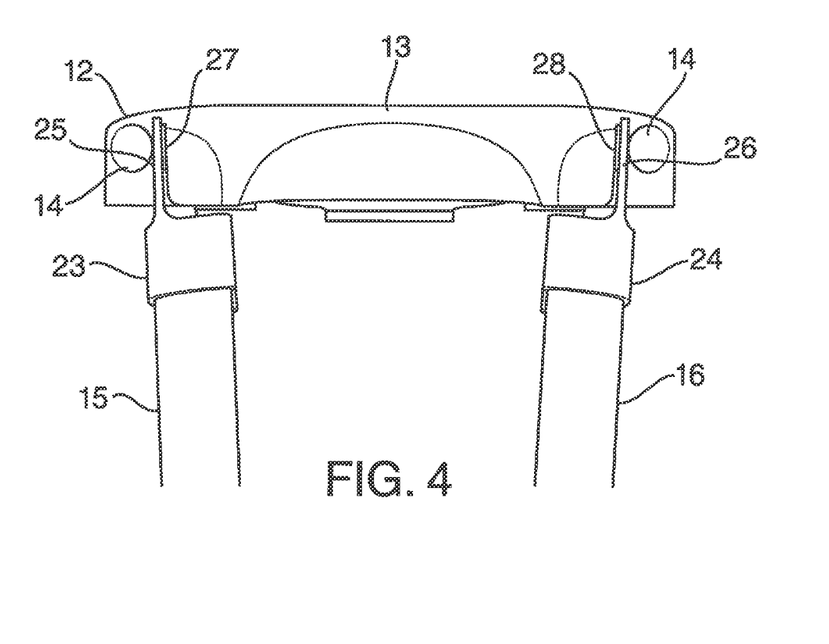
FIG. 4 is a detailed view of the upper end of the leg and the head of the tripod to which it is mounted.

A best seen in FIG. 4, the upper ends of the side members 15, 16 of each leg are secured in caps 23, 24 which have integral upstanding flexures 25, 26 offset to the centre ones of the side members. The flexures have outwardly extending pivot pins 27, 28 which engage in the two aforesaid sockets 14 on the side 13 of the head for the leg to pivot about a horizontal axis indicated at 29 on FIG. 2 which extends parallel to the corresponding side of the head. The flexures 25 and 26 accommodate changes in the convergence angle of the side members 15 and 16 of the leg as the leg is extended and retracted. Also the flexures bias the sides of the leg towards the one position in the range of convergence with extension of the leg, which may be one end of the range or more preferably a mid position in the range. The off-sets of the flexures relative to the centroid at the upper end of each side member and the offset spikes of the feet at the lower ends of the side members are designed to reduce buckling forces on the sides of the leg when the leg is in compression. Three such legs 11 are mounted to the three respective sides 13 of the head 12 form the complete tripod.

As will be explained in detail later, in the preferred embodiment of the invention the lengths of the telescopic side members of each leg are maintained substantially equal throughout the extension and retraction of the leg. Thus the leg forms, with the mounting of the tripod, an isosceles triangle in the fully extended and fully retracted positions and throughout the range of adjustment between fully retracted and fully extended. The triangle is substantially symmetrical about a median line indicated at 32 drawn from the apex at the foot to meet and bisect the side 13 of the head. The locus of movement of the apex between the extended and retracted states of the leg is substantially linear forming an extension to the median line 32 as described in greater detail below.

Each side member 15, 16 of the leg 11 comprises telescopically interconnected aluminium alloy extrusions consisting of an upper member 40, an intermediate member 41 and a lower member 42. The members reduce in cross-section down the leg so that the members can telescope together one within the next when the leg is retracted. The upper members 40 provide an upper stage to the leg the span of which is indicated by the bracket U on FIG. 2; the intermediate members 41 of the legs form a mid-stage of the leg the span of which is indicated by the bracket M and the lower members 42 of the leg constitute a lower stage, the span of which is indicated by the bracket L.

Figure 5:
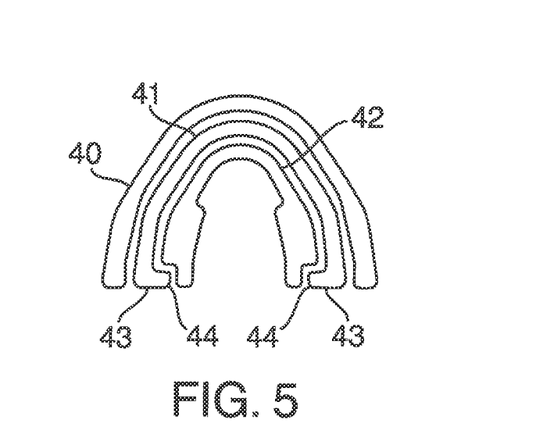
FIG. 5 is a cross-sectional view through one of the telescopic sides of the leg showing the members of the side nested together.
Figure 6:
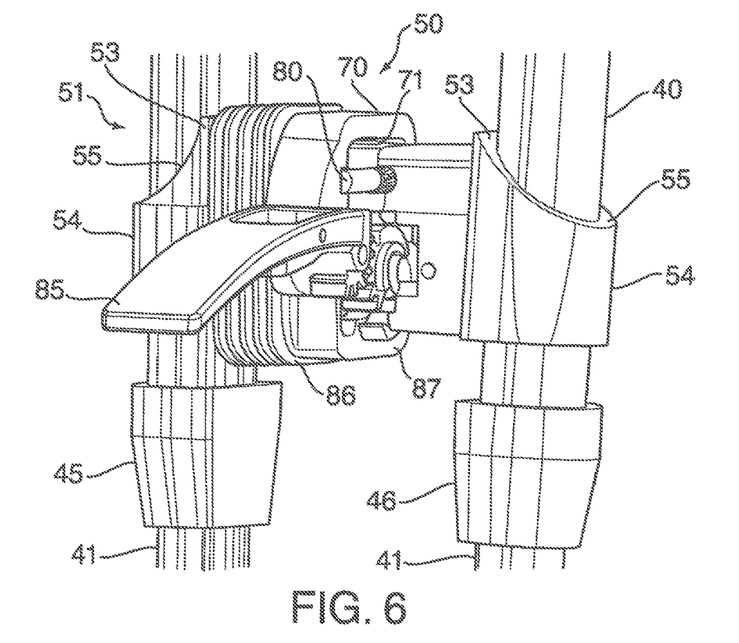
FIG. 6 is a partly cut away perspective view of a mechanism for controlling extension of the side members of the leg and for locking the members against extension/retraction.
Figure 7:
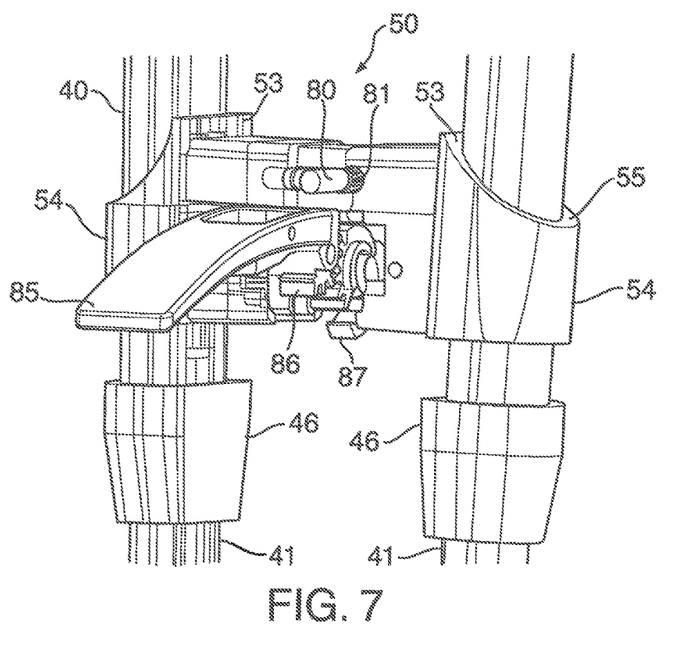
FIG. 7 is a similar view to FIG. 6 with parts of the housing for the control mechanism removed to show more details of the clamping mechanism and mechanism for maintaining the triangular form of the leg during adjustment.
Figure 8:
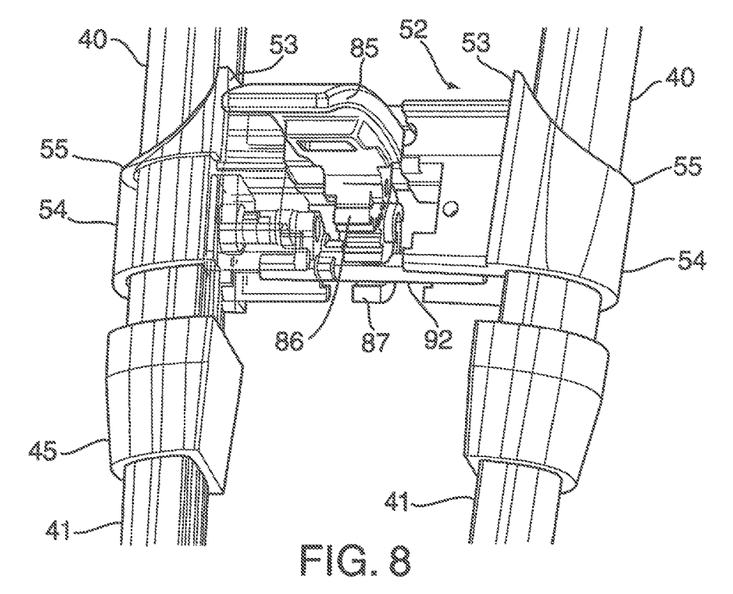
FIG. 8 is a similar view to FIG. 7 looking from below the clamping and control mechanisms for maintaining the triangular form of leg during adjustment of the length of the leg.
Figure 9:
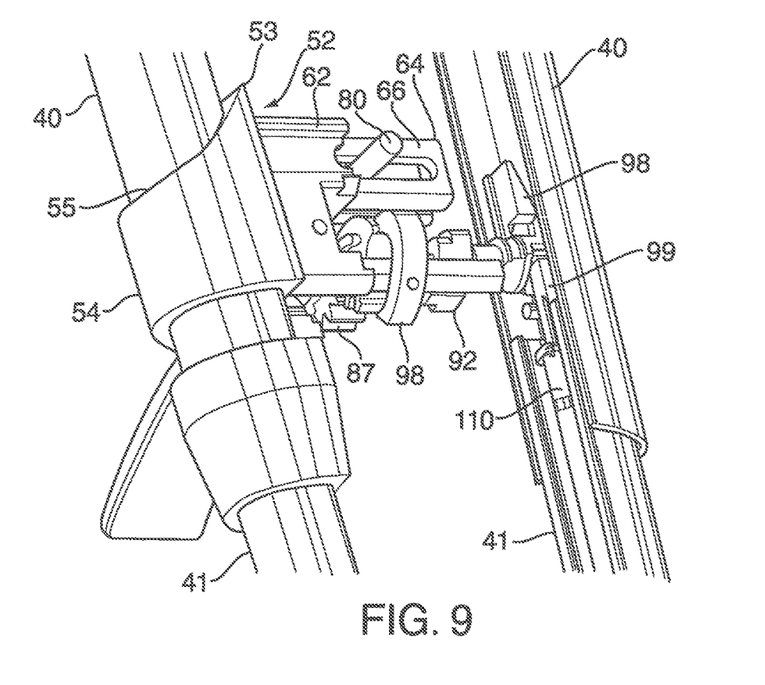
FIG. 9 is a further view of the clamping mechanism and means for maintaining the triangular form of the leg during adjustment looking from the rearward side of the leg.

The members of each leg are of generally U-shaped cross-section as can be seen in FIG. 5 in which the three sections of the leg are shown nested together. The intermediate member 41 of each side of the leg 11 has in-turned abutments 43 at its mouth which engage in recesses 44 at the outer edges of the mouth of the lower member 42 to hold the lower member captive in the intermediate member whilst permitting the lower member to slide into and out of the intermediate member. The members 40, 41 and 42 are of substantially equal lengths.

The lower ends of the members 40 of the upper stage of the leg are secured in sockets 45, 46 which provide bearings in which intermediate members 41 of the leg which are slidable. The lower ends of the intermediate members 41 of the leg are secured in sockets 48, 49 which provide bearings in which the lower members 42 of the leg are slidable.

As indicated earner, the three stages of the leg are extendible and retractable to enable the camera mounting to be set at a required height to suit the scene being recorded and releasable clamps are provided between the respective members of the upper and intermediate and intermediate and lower stages to clamp the legs at the selected length. The triangular structure formed by the side members of the leg and the head 12 to which it is connected provide a rigid structure when the clamps are locked. When the camera is moved on the tripod stand and in particular when the camera is panned which imposes a torque on the stand, the torque is resisted by the rigid legs in the respective planes of the legs. However, when the clamps for the members of the legs are released to allow adjustment of the height of the legs, the triangular form of leg which is hinged at each corner loses its rigidity in the plane of the leg and unless provision is made to ensure that the extension and retraction of the respective sides of the leg is maintained substantially equal, the isosceles form of triangular leg will not be preserved.

Mechanisms indicated generally at 50 for clamping the members of the leg against extension and for equalising extension of the members of the leg will now be described with reference to FIGS. 6 to 17 of the drawings to which reference should now be made. As mentioned earner, the members of the leg are formed from generally U-shaped channel section aluminium alloy extrusions. The components of the locking/equalising mechanisms are formed from precision plastic mouldings unless otherwise indicated.

Sleeves 51, 52 are which are D-shaped in cross-section are secured to the upper ends of the intermediate members 41 of the leg. Each housing has a flat base 53 to which annular upper end of en intermediate member is secured and a part annular wall 54 on one side of the base in which an upper leg member 40 is slidable. The upper end of the part annular wall 54 is partially cut away as indicated at 55 to clear the cape 23, 24 at the top of the upper members 40 of the leg when the leg is in the fully retracted state.

At the upper end of each intermediate leg member 41 there is an upper clamp carrier 56 (see FIG. 10) formed with a downwardly projecting spigot 57 which engages in and is bonded to the upper end of intermediate member 41. At the top of the carrier 56 there is a laterally facing slide 58 which is received in a slideway 59 on the base 53 within sleeve to which it is secured.

The outer side of the base of the sleeve has a laterally projecting rectangular cross-section plug 60 having radiused corners 61 and side channels forming slideways 62 on either side of the plug A carrier 70 lies between the clamp housings 51, 52 and the plugs 60 extend into a socket 71 extending through the carrier. The carrier thus forms a bridge between the housings. The carrier is formed in two symmetrical mouldings with a vertical line of split indicated at 70a for ease of assembly of components within the carrier.

Towards the upper end of the socket 71 in the carrier 70 there are integrally moulded slides 73, 74 projecting out of either side of the socket and having enlarged heads 75, 76 at the ends of the slides. The heads engage in the slideways 62 on either side of the plugs 60 to constrain the clamp housings to move into and out of the carrier whilst allowing a limited rotation of the housings in a vertical plane to accommodate the changes of angle of the Intermediate members of the leg as the leg is extended and retracted.

The plug 60 also has a pair of laterally spaced horizontally projecting tongues 63, 64 formed integrally with the plug. The tongues have horizontally extending slots 65, 66 formed in alignment with one another. The tongues 63, 64 on the respective plugs to either side of the carrier are staggered so that, as viewed in FIG. 10, tongue 63 on the left hand plug is interleaved between tongues 63 and 64 of the right hand plug. Tongue 63 of the left hand plug has a downwardly facing rack 67 along its upper edge and tongue 64 of the right hand plug has an upwardly facing rack 68 along its lower edge.

A central shaft 80 is mounted for rotation and limited movement in a vertically extending slot 70b in the carrier 70 towards the upper side of the socket 71. The shaft passes through the slots 66, 66, in the interleaved tongues plates 63, 64 and carries an integral toothed wheel 81 which engages the opposing overhanging and underhanging racks 67, 68 on the tongues so that the clamp housings 51, 52 are constrained to move by equal amounts and in opposite directions with respect to the carrier.

A forward side of the carrier 70 has a pair of horizontally spaced vertically extending flanges 82, 83 and an aperture 84 is provided in the wall of the carrier behind the flanges. A manually operable lever 85 is mounted on a horizontal pin (not shown) extending between the flanges to swing in a vertical arc and is formed with an integral segmental gear 86 extending partway around the lever pivot. A second segmental gear 87 has a part-cylindrical bearing surface 88 and is mounted for rotation about a parallel axis to the lever in arcuate seats indicated at 89, in the carrier. The segmental gear of the lever meshes with the further segmental gear to rotate the further gear with rotation of the lever.

The second gear 87 is formed with a pair of jaws 90, 91 between which a horizontally extending metal bar 92 is pivoted eccentrically with respect to the axis of gear 87 on a pin extending orthogonally to the axis of gear 87. Horizontal shafts 93 are supported for rotation in bores (not shown) in the respective plugs of housings 52, 53 to either side of gear 87 in carder 70. Each shaft has an integral V-shaped member 94 at an inner end adjacent to the gear in which one end the bar 92 attached to gear 87 is slidable to transmit rotation of the bar with c the gear to the shafts 93. The ends of the bar 92 are slidable in the recesses of the V-shaped member 94 with movement of the members of the leg towards and away from each other and the recess also provides clearance for angular movement of the bar with respect to the V. The pivot mounting for the bar ensures that equal loads are applied to the V-shaped members at either end of the bar.

Each shaft 93 has a transverse dog 93a at an outer end and a cam member 95 located in a vertical slot in boss 60 has a transverse groove in which the dog is slidably engaged to provide a driving connection to the cam member. The cam member can float up and down in the slot when dog 93a is vertically aligned as described below. The cam member has diametrically spaced elements 96, 97 which act on angled faces 98a, 99a on the cam followers 98, 99 located within the upper end of the leg member to drive the follower 98 upwardly and the follower 99 downwardly to actuate clamps for locking the members of the legs as described below. The vertical movement provided for the cam referred to above allows the forces applied to the cam followers to equalise automatically and thereby to equalise the braking force applied to the clamps.

The manually operable lever 85 has a latch element 100 hinged to the lever having a projecting detent 101 which can snap into engagement in an opening 100a in the side wall of the carrier below the flanges to hold the lever in a position in which the clamps locking the members of the leg together are engaged. At the same time, the reaction to the clamping force applied through the bar presses the slides against the bridge to lock the slides against movement. The manually operable lever is released by depressing the latch on the lever to disengage the latch from the aperture in the carrier to allow the lever to be lifted causing rotation of the further gear and thereby rotation of the cams to release the clamps locking the members of the leg together for adjustment of the leg.

It will be appreciated that as the leg is extended and retracted, the separation of the upper members 40 of the leg will vary and the arrangement of a centrally mounted pinion and toothed racks projecting from opposite sides of the leg and engaging on opposite sides of the pinion will ensure that the respective lateral movements of the side members of the leg will be mirrored with respect to the centre line 32 through the leg, that is the movements will be maintained equal and opposite to one another to preserve the isosceles triangle format from the clamping stage to the apex of the leg throughout the extension and retraction of the leg.

The arrangement for operating the clamps for the stages of the leg will now be described.

Figure 17:
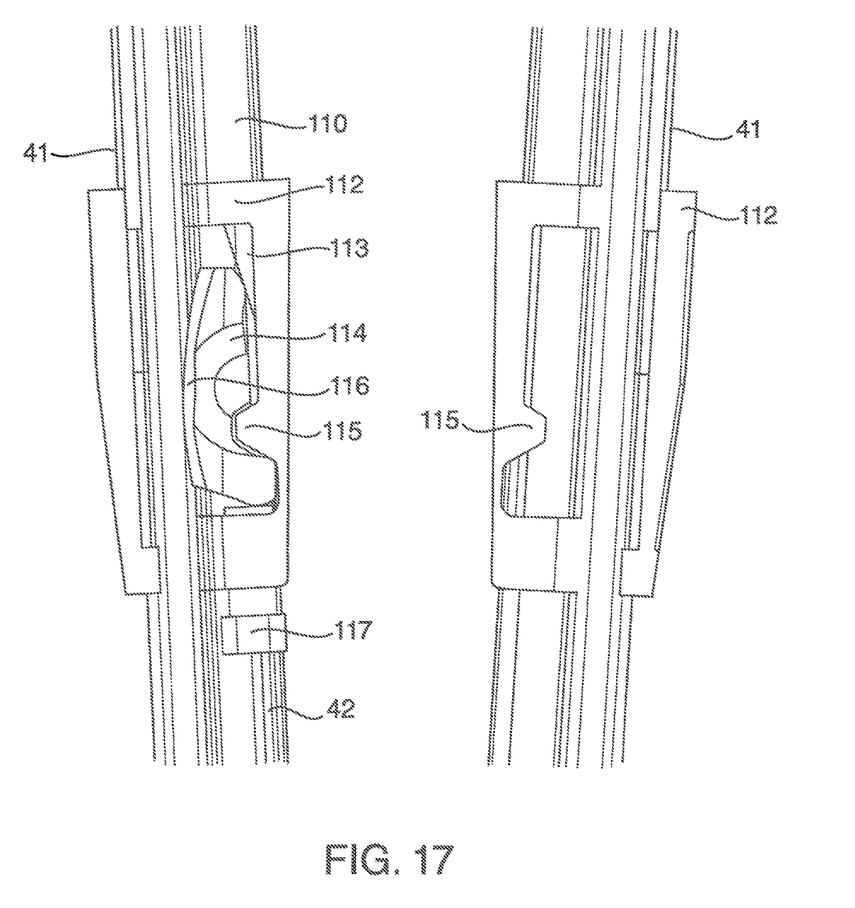
FIG. 17 is a sectional view through intermediate and lower stages of the leg depicting the locking devices for locking those stages against extension/retraction.

The lower cam followers 99 are formed integrally at the upper ends of push rods 110 extending downwardly through the cavity in the intermediate leg member 41. A clamp housing 48 and 49 is mounted at the lower end of each intermediate leg member 41 as shown in FIG. 17. The clamp housing, has an upper wall 112 through which the push rod 110 extends to act on a wedge 113 located in the upper end of the housing. The wedge in turn acts on a clamping pad 114 supported on a tongue 115 projecting inwardly from the outer side of the housing and the inner face of the clamping pad bears against the inner side of the lower leg member 42 to clamp the leg member to the intermediate leg member when the push rod is forced downwardly to press the clamping pad outwardly through the wedge 113. The position of the clamping pad is adjusted to remove free play in the clamping mechanism by a screw adjustor 117 projecting from the lower side of the clamp housing through the wall of the clamp housing to bear against the underside of the clamping pad.

Figure 10:
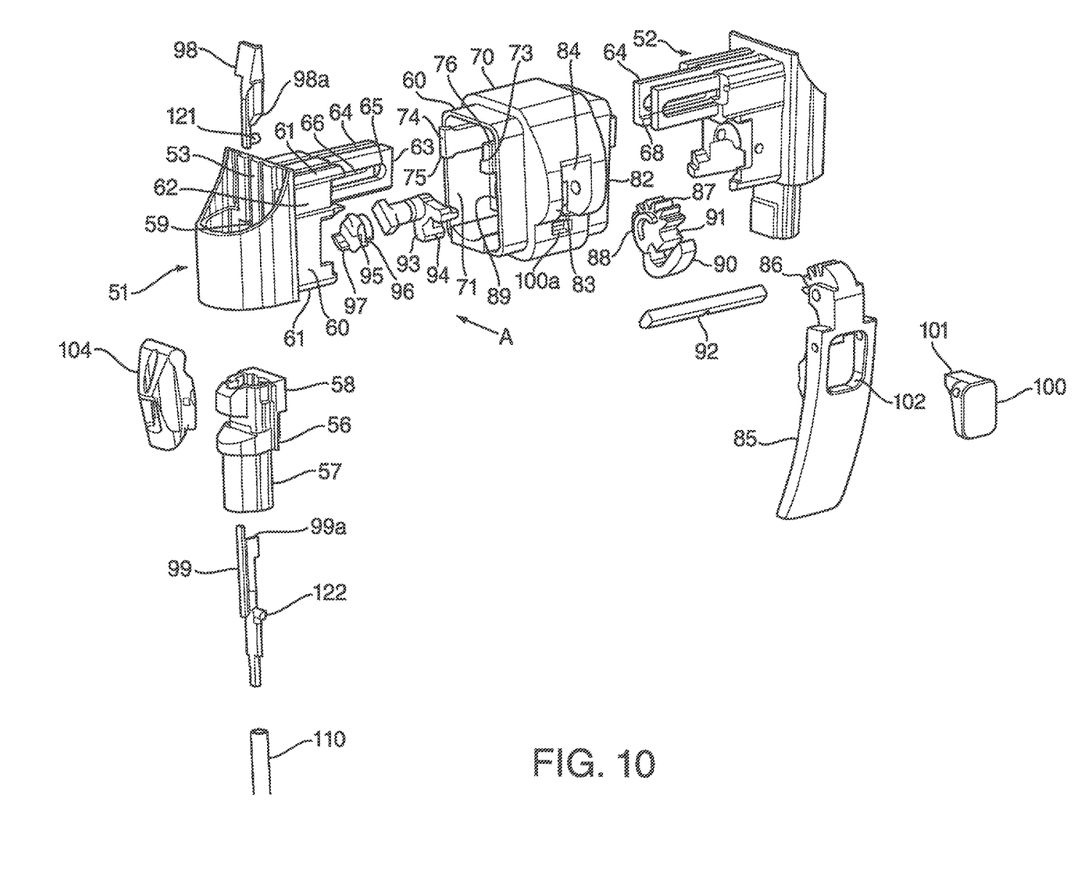
FIG. 10 is an exploded perspective view of the equalising/locking mechanism.
Figure 11:
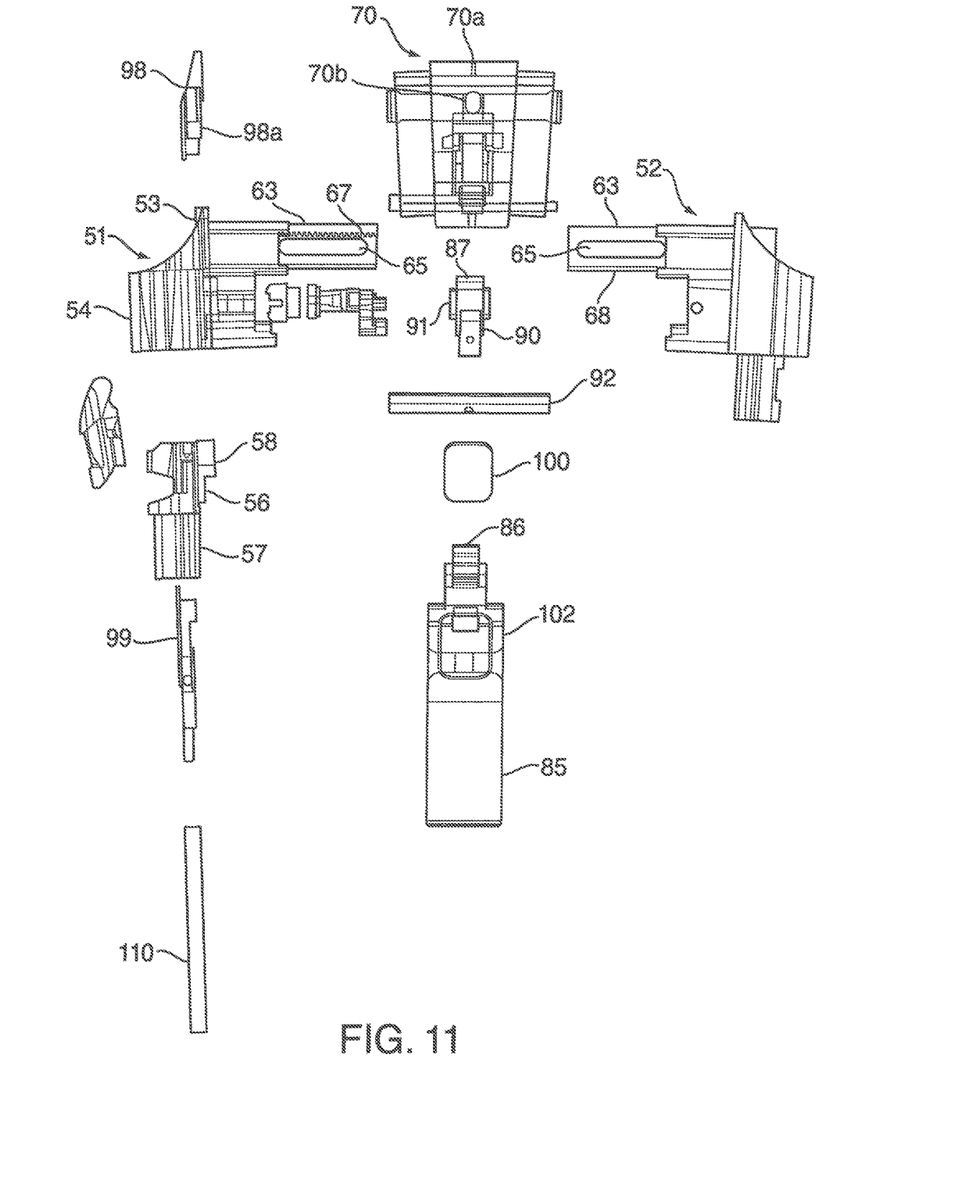
FIG. 11 is an exploded elevation view of the mechanisms.
Figure 12:
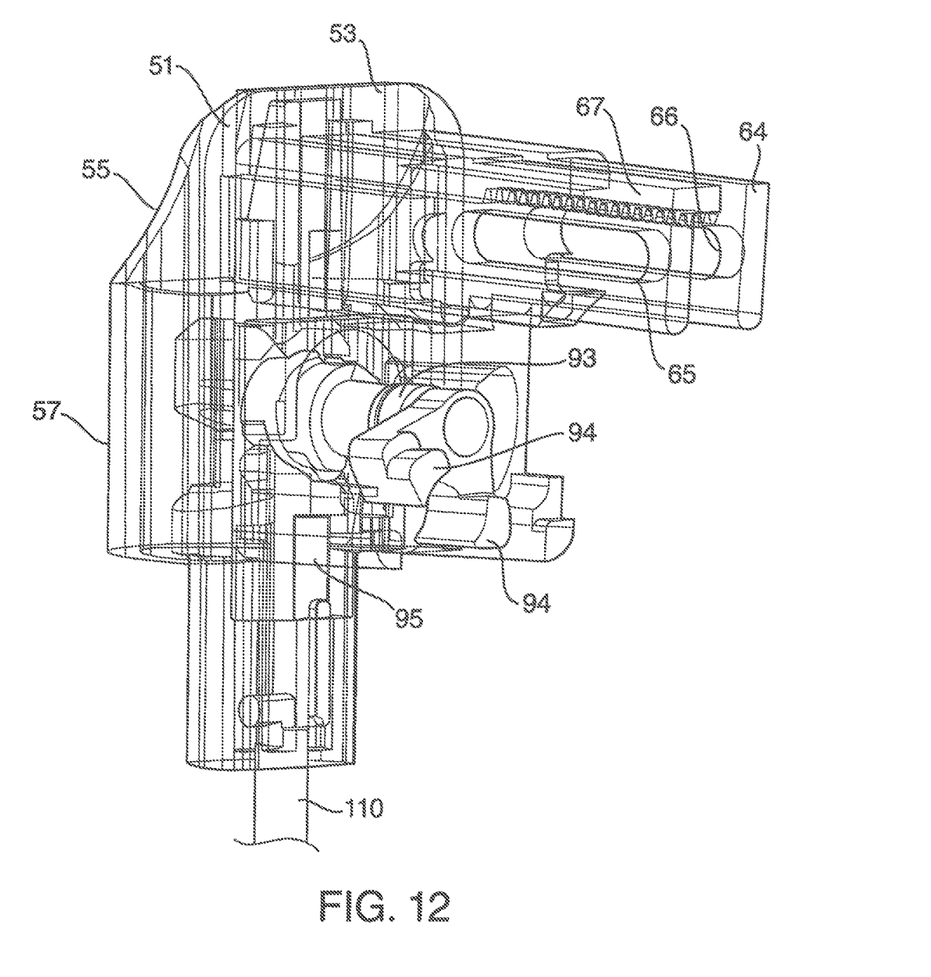
FIG. 12 is an enlarged detailed view of part of the mechanisms looking in the direction of arrow A on FIG. 10.
Figure 13:
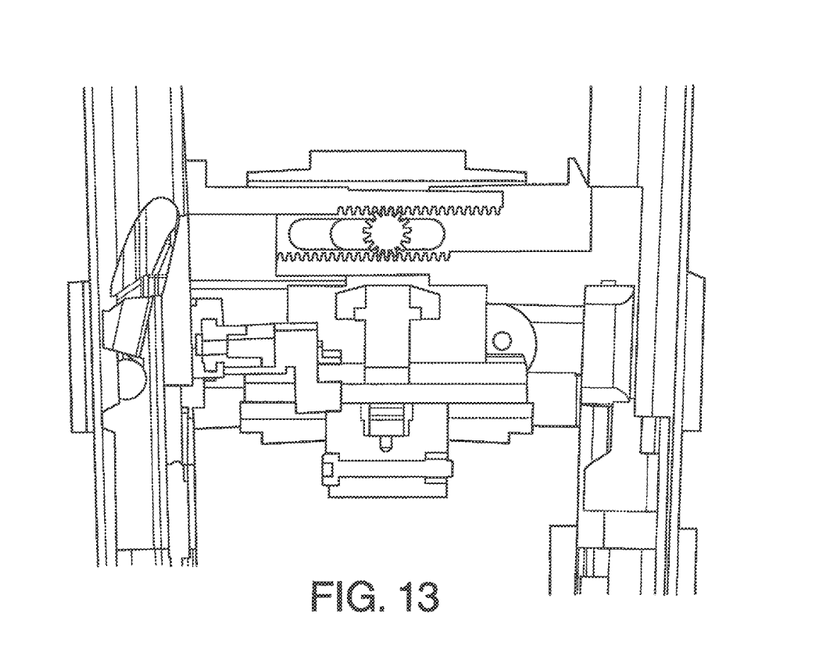
FIG. 13 is a vertical cross-section through the clamping and control mechanisms.
Figure 14:
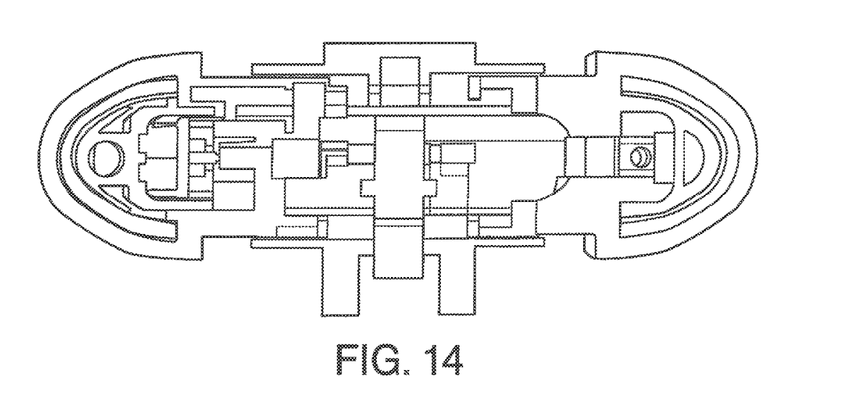
FIGS. 14 to 16 are horizontal cross-sections through the mechanisms.
Figure 15:
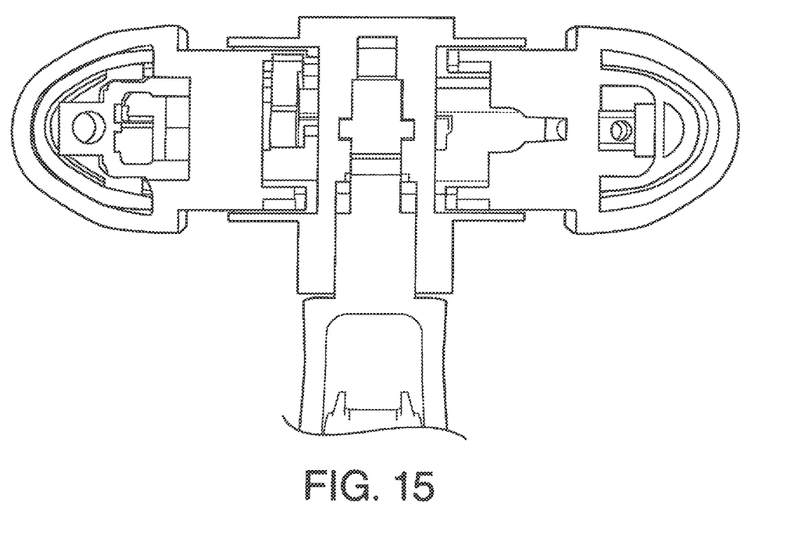
Figure 16:
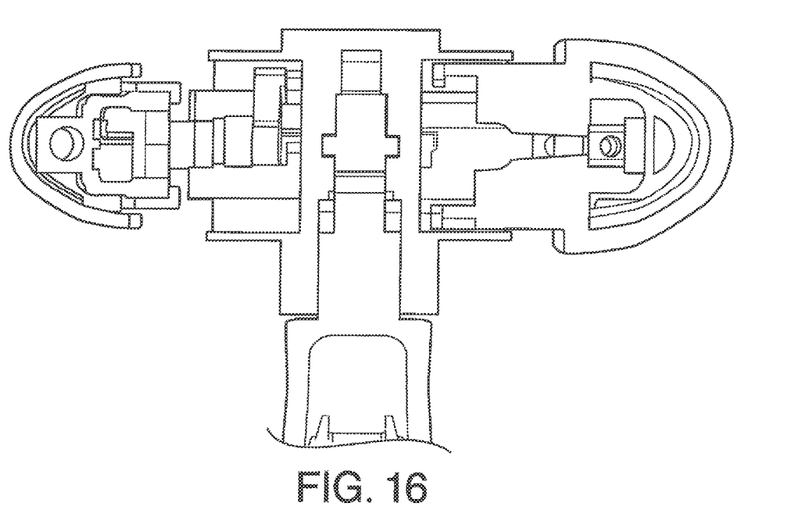

Referring to FIGS. 10 to 11, the mounting block at the upper end of the intermediate member supports an upper clamping pad 104 in a similar manner to the arrangement for supporting the lower clamping pad.

The upper cam follower 98 acts directly on a clamping pad 104 acting on the inside of the upper member 40 of the leg to clamp the intermediate member against movement with respect to the upper member of the leg. The upper and lower cam followers 98, 99 have projecting lugs 121, 122 which are connected by a tensioned coil spring (not shown) to assist in the release of the clamps. It will be appreciated that because the rotary cam member 95 is free to move up and down in the slot in the base 60 of clamp housing the braking pressure imposed on the clamping pads will be equalised. Likewise and the clamping loads applied to each side of the leg will be equalised through the pivotable bar 92 which rotates the cam members on either side of the leg.

The arrangement for operating the clamps clamping the members of the leg against movement with respect to one another equalising the forces clamping the upper member to the intermediate member and the intermediate member to the lower member and the arrangement of the bar acting on the clamping mechanisms on either side of the leg ensures that the forces acting on the two sets of clamping mechanisms are equalised.

By arranging the clamping mechanism to operate through the cavities in the U-shaped members of the leg, the central space of the triangular leg is kept free apart from the clamping lever for operating the clamping arrangement. The connection of the plates by the shaft and pinion arrangement referred to above ensures that lateral movement of the members of the leg will always be mirrored to preserve the isosceles form of triangle of the leg from the clamping mechanism to the apex and also ensure that the intermediate members of the leg always move together by controlling that movement, the extension and retraction of the lower members of the leg will also be maintained equal so that the extension and retraction of each side of the leg is maintained equal, thereby preserving the isosceles form of the triangle and ensuring that the apex of the leg will move along the central axis of the triangle about which the triangle is symmetrical.

No mechanism as such is provided for ensuring that the intermediate members of the leg move equally with respect to the upper members of the leg but the flexures 25, 26 which connect the upper members of the leg to the mounting provide a light force biasing the members towards one another when the leg is in any extended position. Because the forces generated are equal and opposite, they act in away which preserves the isosceles form of the leg throughout extension and retraction.

Flexible tubular bellows 120 are located between the central housing and clamp housings to enclose the mechanisms referred to above to prevent ingress of dirt particles or liquids.

It will be appreciated that many modifications may be made to the above embodiment without departing from the scope of the invention. For example the leg may have multiple intermediate stages between said upper and lower stages and the clamping means are provided on a number of the stages for clamping the stages against extension/retraction where the leg has an odd number of intermediate stages and the clamping means may be provided on alternate intermediate stages to clamp that stage or those stages to the stage nearer the base and to the stage nearer the apex of the leg. Alternatively the clamping means may be provided on alternate intermediate members to clamp the respective stages to the stage nearer the base and the stage nearer the apex and clamping means are provided on the stage next to the lower stage to clamp that stage to the lower stage.

In a further arrangement a mechanism maintains the angle of convergence between the upper members of the leg symmetrical during extension and retraction of the leg to maintain the isosceles form of the leg from the bridge to the apex during adjustment.

The invention claimed is:

1. An extendable leg for a tripod, the leg being V-shaped and having telescopic side members to enable a length of the leg to be varied and comprising hinge means connecting the side members to each other at an apex of the V, means to connect the side members to a head of the tripod which allow an angle of the V to vary with extension and retraction of the leg, and clamping means to clamp the side members at a required length, wherein the telescopic side members are maintained straight throughout the extension and retraction of the leg, and while the side members are being clamped and unclamped;

wherein the leg has a mechanism for controlling the extension and retraction of the side members when a locking means is released whereby the apex of the V is constrained to move generally linearly in a lengthwise direction of the leg; wherein said mechanism comprises arms and a bridge linking the arms to move with each other in a longitudinal direction of the leg; the mechanism further comprising means to interconnect the arms; and wherein the arms have toothed racks and the means to interconnect the arms comprise a pinion rotatably mounted on the bridge and in engagement with the toothed racks on opposite sides of the pinion to cause the side members to which the toothed racks are mounted to move by equal amounts and in opposite directions with respect to a median line.

2. An extendable leg as claimed in claim 1, wherein said mechanism for controlling the extension and retraction of the side members of the leg constrains the apex to move linearly in line with the median line which extends from the apex of the V lengthwise of the leg.

3. An extendable leg as claimed in claim 1, wherein the mechanism comprises means acting on the side members to cause the side members to move by equal amounts and in opposite directions with respect to said median line whereby the apex of the V is caused to move linearly in line with said median line.

4. An extendable leg as claimed in claim 3, wherein the leg comprises a plurality of stages, one of which is an upper stage and one of which is a lower stage, and each stage comprises a pair of elongate members telescopically engaged with the elongate members of one or more adjacent stages of said plurality of stages, with releasable clamping means between the one or more adjacent stages to enable the length of the leg to be adjusted as required, and wherein the mechanism acts on the elongate members of at least one stage of said plurality of stages so that a part of the leg extending from the at least one stage to the apex is controlled so as to constrain the apex to move linearly in line with said median line as the length of the leg is adjusted.

5. An extendable leg as claimed in claim 4, wherein the leg has at least one intermediate stage and said mechanism constrains the elongate members of the at least one intermediate stage to move with each other in the lengthwise direction of the leg and to move by equal amounts and in opposite directions towards and away from said median line as the length of the leg is adjusted.

6. An extendable leg as claimed in claim 5, wherein the mechanism maintains at least a part of the leg from said at least one intermediate stage to the apex of the V in the form of an isosceles triangle so that the apex of the V moves in line with a median of the triangle as the length of the leg is adjusted.

7. An extendable leg as claimed in claim 6, wherein the arms project from the at least one intermediate stage and said means to interconnect the arms cause the arms to move by equal amounts and in opposite directions with respect to said median line as the leg is extended and retracted, whereby the apex of the V is caused to move in line with said median line as the length of the leg is adjusted.

8. An extendable leg as claimed in claim 7, wherein the arms project from corresponding positions on said elongate members of the at least one intermediate stage and have an articulated engagement with the bridge to allow the arms to swivel with respect to the bridge as a convergence angle of the side members changes with extension and retraction of the leg whilst the elongate members of the leg move by equal amounts and in opposite directions with respect to the median line.

9. An extendable leg as claimed in claim 8, wherein said means to interconnect the arms are mounted on the bridge and act between the arms to cause the arms to move by equal amounts and in opposite directions with respect to said median line.

10. An extendable leg according to claim 1, wherein a clamping means is provided on the bridge for locking the arms against movement with respect to the bridge and an actuator member is mounted on the bridge for engaging and releasing the clamping means.

11. An extendable leg as claimed in claim 10, wherein said actuator member mounted on the bridge for engaging and releasing the clamping means for the arms is also arranged to lock and release the clamping means for controlling the extension and retraction of a plurality of stages of the leg.

12. An extendable leg as claimed in claim 4, wherein the leg has a single intermediate stage between said upper and lower stages and said clamping means are provided on said intermediate stage for clamping said intermediate stage to both the upper and lower stages of the leg.

13. An extendable leg as claimed in claim 5, wherein the clamping means for the at least one intermediate stage comprises a pivotally mounted beam located eccentrically between said elongate members of the at least one intermediate stage, a rotary coupling at each end of the beam for applying equal force to the clamping means on the respective elongate members, and an actuator for displacing the beam about the eccentric axis to cause the clamping means to engage and release.

14. An extendable leg as claimed in claim 13, wherein the rotary couplings at the ends of the beam act directly on clamps for clamping the elongate members of the at least one intermediate stage to the elongate members of one of the one or more adjacent stages and to act through push rods extending through the elongate members of the stage to operate clamps for clamping the elongate members of the at least one intermediate stage to the members of another of the one or more adjacent stages, the rotary couplings being arranged to apply substantially equal force to the clamps at the respective ends of the elongate members of the at least one intermediate stage of the leg.

15. An extendable leg as claimed in claim 14, wherein the rotary couplings act directly on the clamping means for the adjacent stage nearer the head of the tripod and through operating members to the clamping means for the adjacent stage nearer the apex.

16. An extendable leg as claimed in claim 13, wherein the rotary coupling has eccentric elements, one of which acts directly on the clamping means for one of the stages and the other of which acts through an operating member extending through the at least one intermediate stage of the leg for applying equal force to the clamping means for clamping the at least one intermediate stage to the one or more adjacent stages.

17. An extendable leg as claimed in claim 13 and in the case where said elongate members of the at least one intermediate stage are linked by the arms and the bridge between the arms, wherein the beam is eccentrically mounted on the bridge.

18. An extendable leg as claimed in claim 17, wherein the beam is mounted eccentrically in an arcuate gear rotatably mounted on the bridge and said actuator is mounted for rotation about a parallel axis on the bridge and has a segmental gear which meshes with the arcuate gear to cause the beam to rotate with rotation of the actuator to apply and release the clamping means.

19. An extendable leg as claimed in claim 13, wherein the elongate members of the leg comprise nested channel section members and an operating mechanism for the clamping means extends through the channel section members of the intermediate section to act on the clamping means at each end of the channel section members.

20. An extendable leg according to claim 4, wherein the elongate members of the upper stage have connections adapted to be pivotally connected to the head for the leg to hinge about an axis extending between ends of the elongate members and to allow the elongate members to pivot towards and away from each other.

\* \* \* \* \*